Oct. 11, 1949.  E. S. WITCHGER  2,484,139
VACUUM SYSTEM FOR WINDSHIELD WIPERS
AND CRANKCASE VENTILATORS
Filed May 10, 1946  3 Sheets-Sheet 3
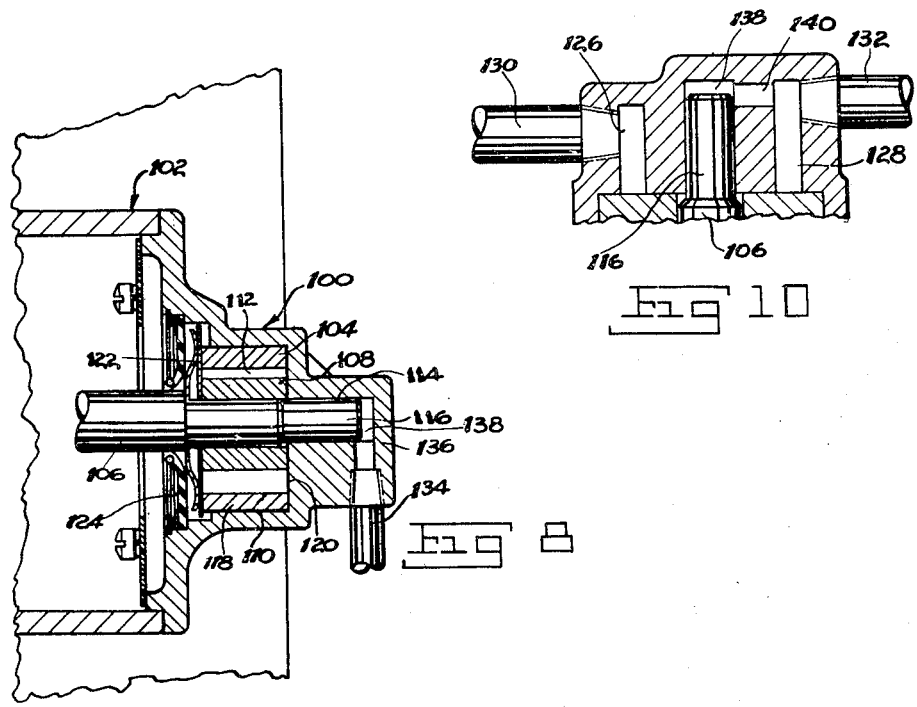
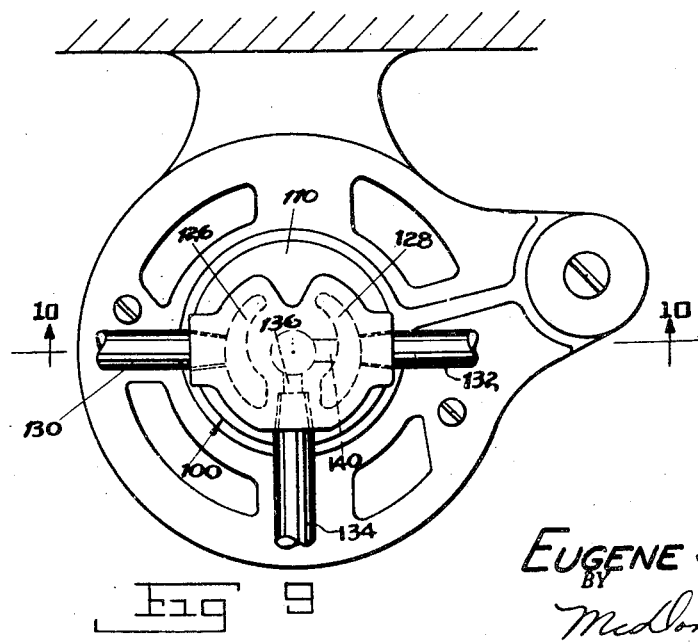
INVENTOR.
EUGENE S. WITCHGER
BY
McDonald & Fagus
ATTORNEYS Patented Oct. 11, 1949

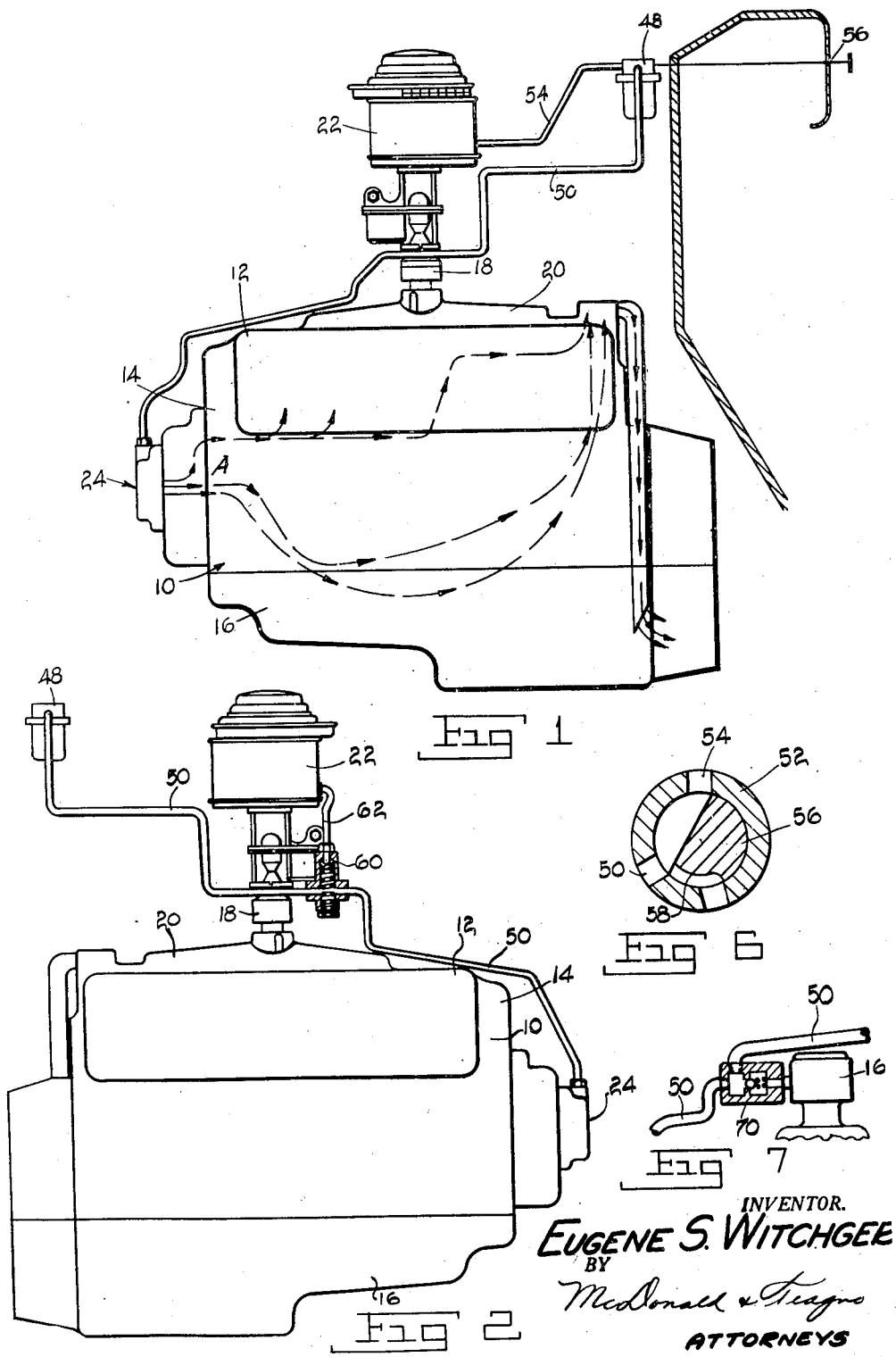

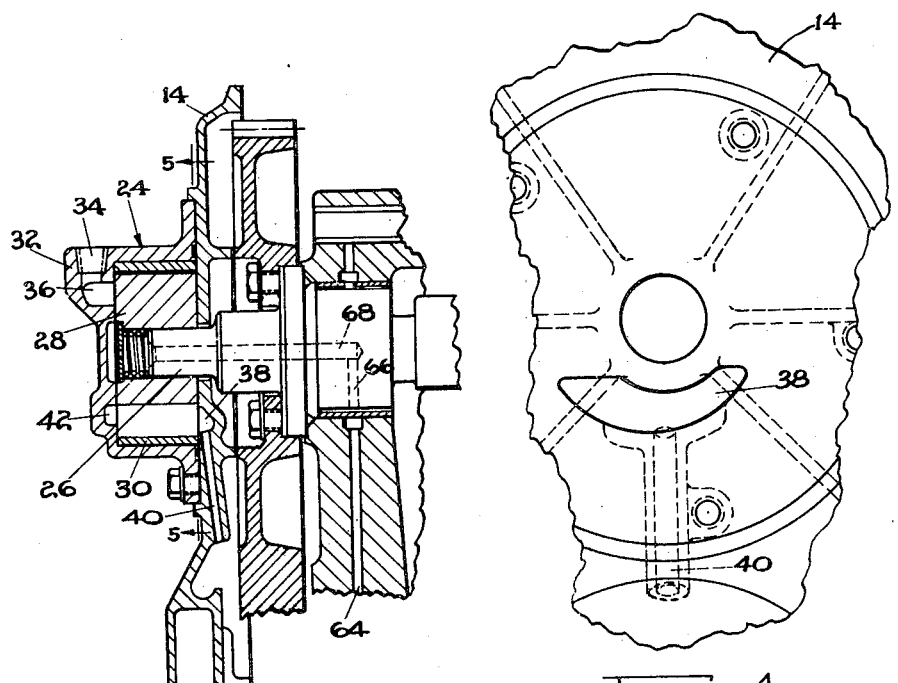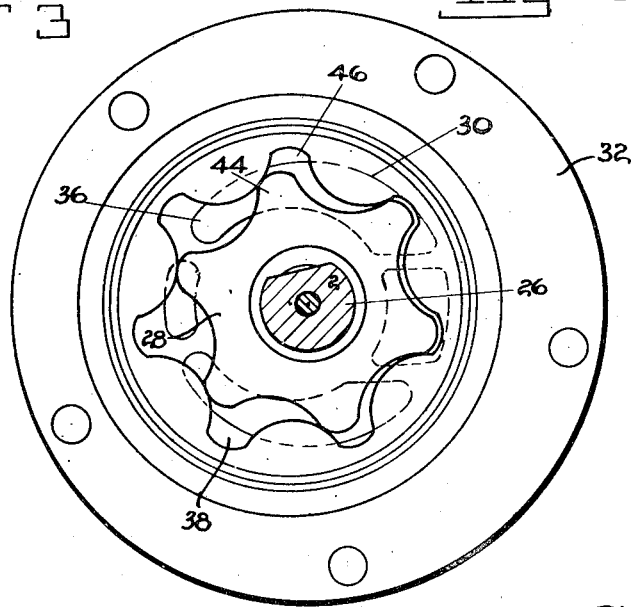

2,484,139

UNITED STATES PATENT OFFICE 2,484,139

VACUUM SYSTEM FOR WINDSHIELD WIPERS AND CRANKCASE VENTILATORS

Eugene S. Witchger, Grosse Pointe Woods, Mich., assignor to Eaton Manufacturing Company, Cleveland, Ohio, a corporation of Ohio Application May 10, 1946, Serial No. 668,970

4 Claims. (Cl. 60—60)

This invention relates to pumps and more particularly to vacuum pumps associated with internal combustion engines for motor vehicles.

Broadly the invention comprehends a pump driven from the camshaft or an accessory drive shaft of an internal combustion engine for motor vehicles for actuating a vacuum operated windshield wiper and also for ventilating the crank case of the motor vehicle.

Although numerous pumps have been devised for the operation of vacuum windshield wipers or other vacuum operated devices for motor vehicles, none have been constructed in association with internal combustion engines for motor vehicles providing for effectual vacuum windshield wiper operation as well as simultaneous crank case ventilation of the engines.

An object of the invention is the provision of an efficient combined vacuum pump and crank case ventilator system for internal combustion engines.

Another object of the invention is the provision of a pump associated with internal combustion engines for motor vehicles operable as a vacuum pump and also for engine crank case ventilation.

Another object of the invention is to provide a pump for motor vehicles wherein both the intake and discharge sides of the pump are used for separate and distinct purposes.

Another object of the invention is to provide a vacuum pump associated with an internal combustion engine with an adequate lubricating means.

A further object of the invention is the provision of a pump driven from the camshaft of an internal combustion engine to provide for a substantial wiper speed that is not affected by depression in manifold vacuum.

A yet further object of the invention is the provision of a pump driven from an internal combustion engine for vacuum windshield wiper operation which is associated through valve means with the manifold of the engine such that the manifold vacuum would assist the pump in the proper and efficient operation of the wiper under all operating conditions of the engine.

A still further object of the invention is the provision of pumping means driven from an internal combustion engine of a motor vehicle for operating vacuum windshield wiper motors associated with the vehicle and for ventilating the crank case of the engine; control means being provided in the pumping circuit for governing the maximum pressure differential which can be obtained in the wiper motor and for permitting all excessive air flows produced by the pumping means to be drawn from the air filter of the engine.

And still another object of the invention is to provide a pump which is permitted to operate at a very low vacuum when vacuum operated accessories are not operating by the incorporation in the pump of a valve permitting air to be drawn from the air filter of an engine with only a small drop in pressure communicated to the accessories sufficient to maintain a held or parking position for said accessories.

Other objects and advantages of the invention will appear from the following description taken in connection with the drawings forming a part of the specification, and in which:

Figure 1 is a side plan view of an internal combustion engine for motor vehicles incorporating a pump therein for operating other windshield wiper motors and for ventilating the crank case of the engine;

Figure 2 is a modification of the structure shown by Figure 1;

Figure 3 is a vertical cross sectional view of the pump incorporated in the engine block;

Figure 4 is a fragmentary end view of Figure 3;

Figure 5 is an enlarged view taken along line 5—5 of Figure 3;

Figure 6 is a cross sectional view of the windshield wiper motor control valve;

Figure 7 is a modified arrangement of the structure shown in Figure 1;

Figure 8 is a cross sectional view of a pump mounted on and driven from an engine generator shaft for vacuum driven operation and crank case ventilation;

Figure 9 is an end plan view of Fig. 8; and

Figure 10 is a cross sectional view taken along line 10—10 Figure 9.

It is the premise of the instant invention to provide pumping means driven from the camshaft or any other suitable take-off of an internal combustion engine for motor vehicles for the vacuum operation of windshield wiper motors associated with the vehicles and also for supplying ventilation to the crank case and other vital parts of the engine requiring ventilation.

Referring to the drawings for more specific details of the invention, 10 represents generally an internal combustion engine comprising a head 12, a block 14, a crank case 16, a carburetor 18 mounted on the engine intake manifold 20, and an air filter 22 associated with the carburetor.

A pump 24 of the Gerotor type is mounted on a camshaft 26 of the engine and includes inner and outer rotors 28 and 30 respectively. A cover housing 32 fixedly secured to the front end of the block 14 encloses the pump rotors 28 and 30 and supports rotor 30 for rotation therein. An inlet opening 34 in the housing 32 communicates with an inlet port 36 of the pump 24; whereas, the outlet port or porting 38 of the pump is provided in the engine block 14 communicating with an outlet passage 40 formed in the block. As a means of compensating for the irregular porting 38 provided in the block of the engine, the cover 32 is formed with a passageway or porting 42 disposed on the opposite side of the rotors from porting 38 to thus provide a discharge for the pump of proper capacity.

The inner rotor 28 of the pump 24 is fixedly secured to camshaft 26, and the outer rotor 30 is mounted eccentrically thereto in the cover 32 for rotation therein. The inner rotor is provided with lobes or teeth 44, one less in number than the cavities 46 formed in the outer rotor 30, such that upon the driving of the inner rotor from the camshaft 26 driving relationship is effected between the inner and outer rotors thus providing vacuum and pressure pumping zones on the opposite sides of the pump corresponding to the inlet and discharge ports of the pump, the purpose of which will hereinafter appear. Although specific illustration of a form of pump to be used is here made, any pump capable of operating in a like manner for fulfilling an equal function may be suitably employed in the system.

With specific reference to Figure 1, pump 24 is shown as associated with a windshield wiper motor 48 adapted to be driven thereby and connected therewith to the intake side of the pump by conduit 50; the discharge of the pump being delivered through outlet port 38 and passage 40 to the interior of the engine block for the venting of the crank case and other internal parts of the engine as indicated by the arrows A. The pump 24 also has communication with the atmosphere through the windshield wiper and air filter as controlled by a three-way valve 52, said valve operating to control the passageway provided through conduit 54 connecting the wiper valve 52 to the engine air filter 22. In the operation of the system illustrated by Figure 1, it is to be noted that the valve 52 can be manipulated by a manual control member 56 so as to provide communication from the air filter directly through the valve to the intake of the pump or directly from the wiper motor to the intake of the pump. When the control member 56 is moved to a position corresponding to parking position of the windshield wiper motor as shown by Figure 6 clean air is drawn from the air filter or cleaner, through conduit 54, through valve 52 into the pump and thence discharged from the pump to the engine crank case through port 38 and passage 40. An intercommunicating passage 58 is provided between the windshield wiper port and pump port for the purpose of effecting a small drop in pressure communication to the wiper motor so as to maintain it in a parked position.

Figure 2 illustrates a modification of the structure shown by Figure 1 wherein the conduit line between the pump intake and wiper motor is controlled by a vacuum spring pressed relief valve 60 inserted in a conduit connection 62 connecting the air filter to the intake side of the pump by way of wiper motor-pump conduit 50, said relief valve operating to govern the maximum pressure differential that can be obtained in the wiper motor so as to permit all excessive air flow produced by the pump to be drawn through conduit 62 from the air filter past the valve 60. As an example wherein wiper motors are operated at between four to eight inches of vacuum, the check valve is set at approximately ten inches such that whenever the vacuum in the system produced by the pump action exceeds this figure, air is drawn from the air cleaner or filter to allow an air flow through the pump to ventilate the crankcase. Accordingly whenever the wiper is shut off as well as when the vacuum pump capacity exceeds that which is required by the wiper motor, the valve would be drawn open.

Limited lubrication is provided for the pump from a fluid supply, not shown, by way of passage 64 in the engine block, and intercommunicating passages 66 and 68 in the pump shaft leading to the pump rotors, said pump utilizing an amount of lubricant necessary to seal the end clearance of the pump against the difference in pressure existing between the intake and discharge sides of the pump. The lubricant that is drawn into the pump is discharged with the air delivered by the pump through the crank case ventilating hole 40 to the engine crank case.

Figure 7 illustrates a further modified form of structure shown by Figure 1 wherein the pump 24 has in cooperation therewith the engine intake manifold controlled as by a check valve mechanism 70 inserted in the conduit 50 between the wiper motor and intake of the pump and connected therebetween with the engine manifold 20 through the carburetor 18 so that the engine manifold vacuum can be added to that of the pump, in the case the pump is undercapacity or it is desired to operate a larger or additional wiper motors. In the operation of this pumping circuit wherein the pump pressure is sufficient for operating the wiper motor, the manifold vacuum will be cut off entirely until such times that the pump pressure falls below a certain predetermined amount, such as at idling speeds of the engine when the capacity of the pump is at a minimum. When the pump pressure falls below the predetermined amount required, the valve 70 which has been correspondingly set to the minimum operating pressure, of the pump will be opened permitting the manifold vacuum to assist in the operation of the wiper motor until such time as the pump again operates with sufficient vacuum for the closing of the valve 70. In this case the vacuum pump would be acting as a booster as the engine vacuum would supply the requirements of the wipers when the volume of the pump drops below predetermined requirements.

Figures 8, 9 and 10 illustrate the arrangement of a pump structure 100 of like nature with that shown by Figures 3, 4 and 5, upon a generator housing 102 having a pump 104 driven by a generator shaft 106, splined to the inner rotor 108 of the pump.

The pump structure 100 includes a body or housing 110 forming the end cover plate of the generator and having a chamber 112 for the pump 104 and providing a bearing support 114 for an extension 116 of the generator shaft 106.

The pump 104 includes inner rotor 108 and an outer rotor 118 meshing with and driven by the inner rotor and supported for rotation in the chamber 112, said rotors being axially mounted in the chamber 112 against an end wall 120 of the pump housing by a spring pressed end plate 122. A seal 124 fixedly secured in the pump housing seals the pump chamber off from any foreign material that may be present in the generator housing.

The housing 110 provides in its one end suitable pump inlet and discharge porting 126 and 128 respectively connected to inlet and outlet conduits 130 and 132 respectively for the pump. The inlet conduit 130 is adaptably associated with vacuum operated devices of a motor vehicle such as a vacuum windshield wiper whereas the outlet conduit is suitably connected to an engine crank case for the ventilation thereof. As a means of providing suitable lubrication for a pump of this kind a filter oil supply is fed to the pump shaft rotors through a conduit 134 suitably secured in the housing and passage 136 communicating with a chamber 138 in the housing at the extremity of shaft extensions 116, said chamber communicating through port 140 with outlet porting 128 of the pump for the delivery therefrom of a lubricant being supplied, to the crank case of the engine. This pump arrangement is capable of functioning in an identical capacity as the pump arrangements herein previously illustrated and defined.

It is to be understood that in each illustration herein made that in addition to the pumps operation as a vacuum pump for windshield wiper operation, it serves the important purpose of providing ventilation for the engine crank case and any other vital parts of the engine requiring ventilation.

While this invention has been described in connection with certain specific embodiments, the principle involved is susceptible of numerous other applications that will readily occur to persons skilled in the art. The invention is, therefore, limited only as indicated by the scope of the appended claims.

What I claim is:
1. An internal combustion engine for motor vehicles comprising a head, a block, a crank case, and an air filter, a pump mounted on the block and driven from the engine having an air intake and an air discharge, a vacuum motor driven by the pump connected to the intake side of the pump, means connecting the filter to the motor, means associated with the motor for respectively controlling the communication of the air filter and motor with the pump so as to maintain a continuous delivery of air from the discharge thereof, and means in the block providing communication of the pump discharge with the crank case and/or engine interior for the ventilation thereof.

2. In an internal combustion engine, a pump driven from an output shaft of the engine, a windshield wiper motor connected to the intake side of the pump, an air filter for the engine, control means associated with the wiper motor for controlling communication of the motor and filter with the pump permitting of a continuous air delivery from the pump, and means associated with the discharge of the pump providing for venting the engine crank case.

3. In an internal combustion engine a pump driven from an output shaft of the engine having intake and discharge ports, said discharge port exhausting into the engine crankcase and/or interior, a vacuum operated motor connected to the intake side of the pump, an air filter of the engine connected to the intake side of the pump through the motor, means associated with the motor for respectively connecting the motor and filter with the pump so as to permit of the continuous delivery of air to the crankcase and/or interior of the engine, lubrication means for the pump, and means incorporated in the pump providing for the combined discharge of air and lubricant from the pump.

4. In combination with an internal combustion engine, a pump driven from the engine having intake and discharge ports, an air filter connected to the intake port of the pump, a suction operated accessory intermediate the air filter and pump connected to the intake port of the pump, and valve means for controlling the operation of the accessory and for providing communication between the air filter and intake port of the pump for all operating conditions of the engine, said discharge port being in communication with the engine crankcase for the continuous ventilation thereof during engine operation.

EUGENE S. WITCHGER.

REFERENCES CITED

The following references are of record in the file of this patent:

UNITED STATES PATENTS

| Number | Name | Date |
| --- | --- | --- |
| 1,305,037 | Vincent | May 27, 1919 |
| 1,869,575 | Murphy et al. | Aug. 2, 1932 |
| 2,088,908 | Horton | Aug. 3, 1937 |
| 2,147,405 | Horton | Feb. 14, 1939 |
| 2,230,594 | Horton | Feb. 4, 1941 |
| 2,243,036 | Horton | May 20, 1941 |
| 2,289,651 | Horton | July 14, 1942 |
| 2,392,458 | Carlson | Jan. 8, 1946 |